(12) United States Patent
Keam et al.

(10) Patent No.: US 8,018,442 B2
(45) Date of Patent: Sep. 13, 2011

(54) CALIBRATION OF AN OPTICAL TOUCH-SENSITIVE DISPLAY DEVICE

(75) Inventors: Nigel Keam, Redmond, WA (US); Prafulla Masalkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 12/235,205

(22) Filed: Sep. 22, 2008

(65) Prior Publication Data

US 2010/0073326 A1 Mar. 25, 2010

(51) Int. Cl.
*G06F 3/042* (2006.01)
(52) U.S. Cl. .......................................... 345/175; 345/173
(58) Field of Classification Search .................... 345/175
See application file for complete search history.

(56) References Cited

U.S. PATENT DOCUMENTS

| | | | |
|---|---|---|---|
| 3,634,614 A | 1/1972 | Geusic et al. | |
| 3,741,639 A | 6/1973 | Snelling | |
| 4,114,991 A | 9/1978 | Bleha et al. | |
| 5,220,166 A | 6/1993 | Takeuchi et al. | |
| 6,710,767 B1 * | 3/2004 | Hasegawa et al. | 345/157 |
| 2001/0046294 A1 | 11/2001 | Bandy et al. | |
| 2004/0009724 A1 | 1/2004 | Carter et al. | |
| 2006/0203125 A1 | 9/2006 | Sayre | |

FOREIGN PATENT DOCUMENTS

WO 03023338 A1 3/2003

OTHER PUBLICATIONS

Ashdown, et al., "A Flexible Projector-Camera System for Multi-Planar Displays", In Proceedings of Computer Vision and Pattern Recognition, 2004, pp. 165-172.
Chen, et al., "Automatic Alignment of High-Resolution Multi-Projector Displays Using an Un-Calibrated Camera", Proceedings of the 11th IEEE Visualization 2000 Conference (VIS 2000), 2000, 6 pages.

* cited by examiner

*Primary Examiner* — Kevin Nguyen
*Assistant Examiner* — Sepideh Ghafari
(74) *Attorney, Agent, or Firm* — Alleman Hall McCoy Russell & Tuttle LLP

(57) ABSTRACT

Embodiments related to the calibration of an optical touch-sensitive display device are disclosed. For example, one disclosed embodiment comprises a method of calibrating an image sensor, wherein the method comprises placing a photoluminescent panel over the display surface, and illuminating a target location on the display surface with visible light. Infrared light that is emitted by the panel in response to the illumination of the display surface is received via the image sensor. The received light then is used to calibrate the device.

20 Claims, 4 Drawing Sheets

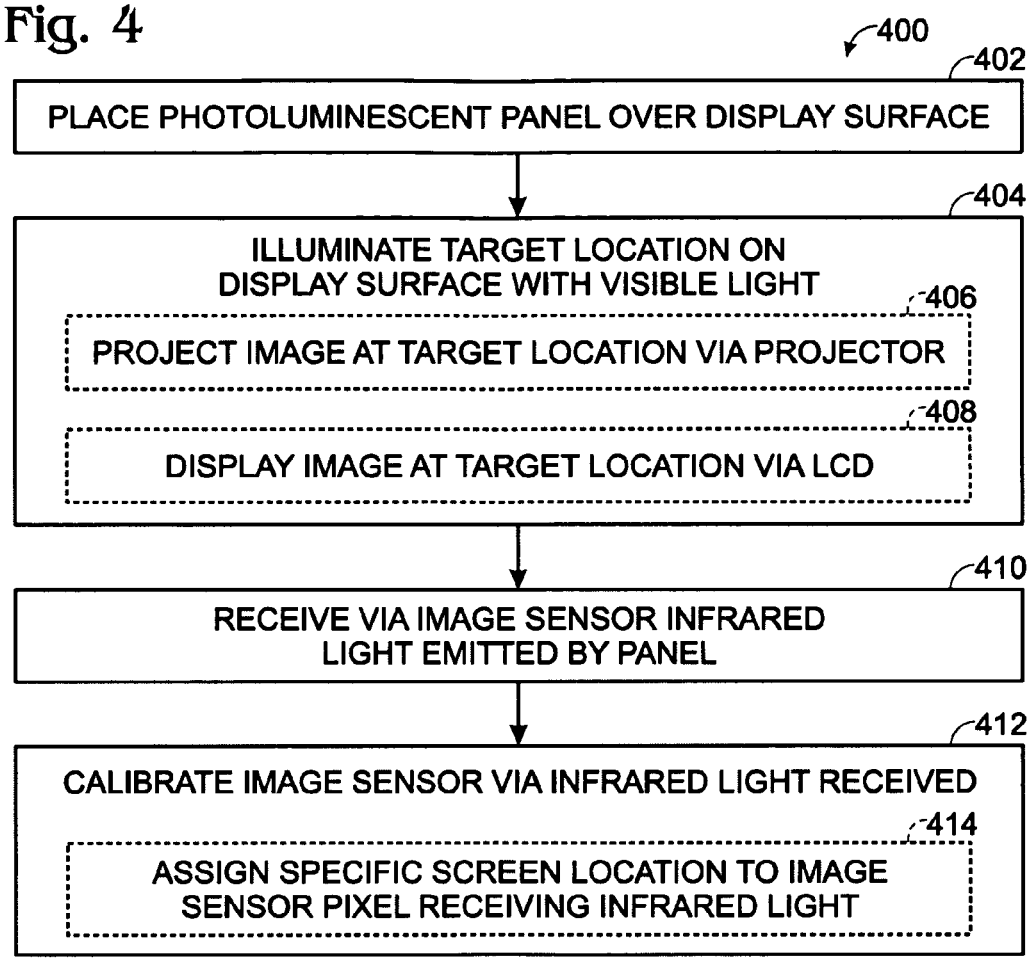

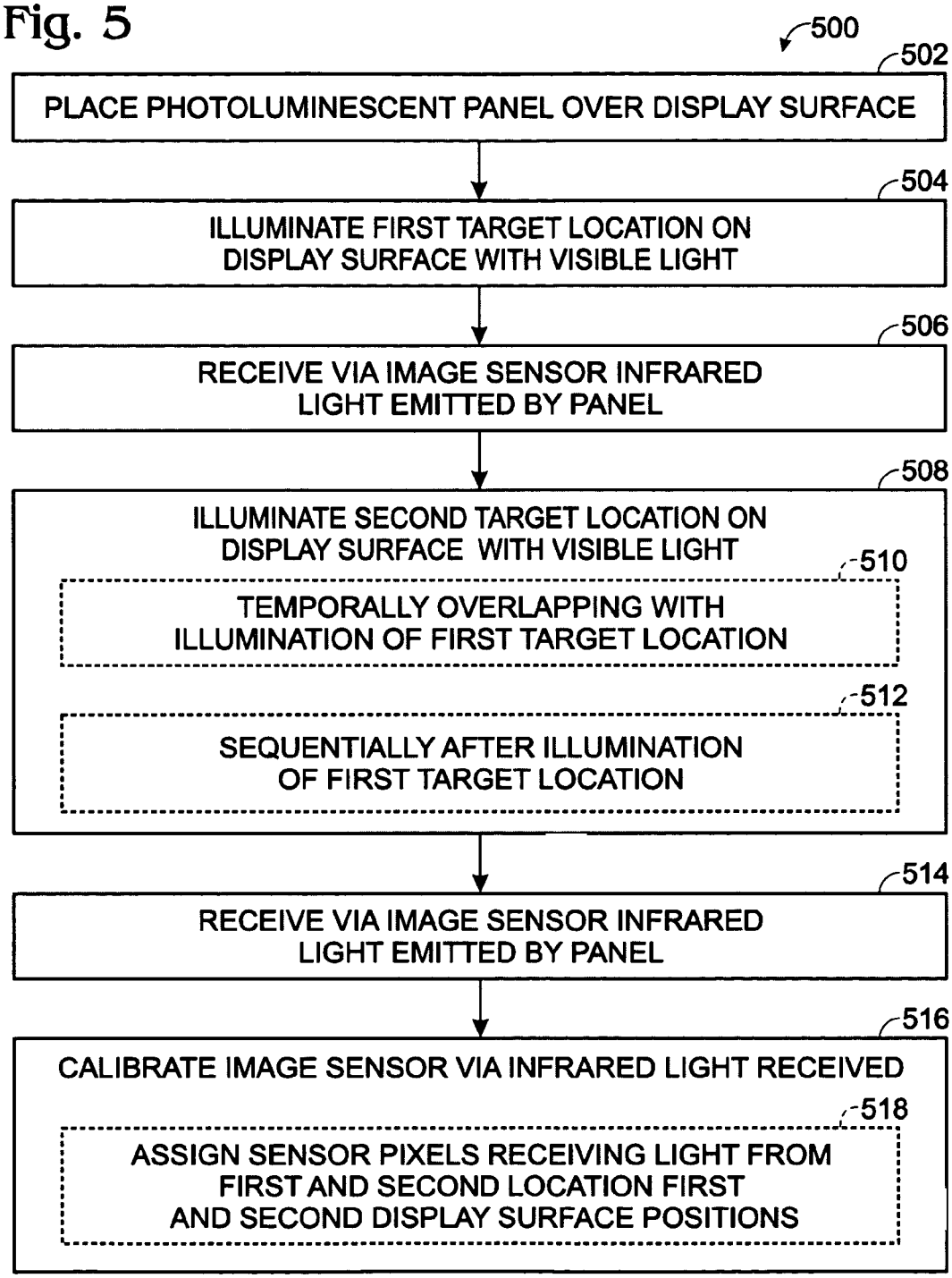

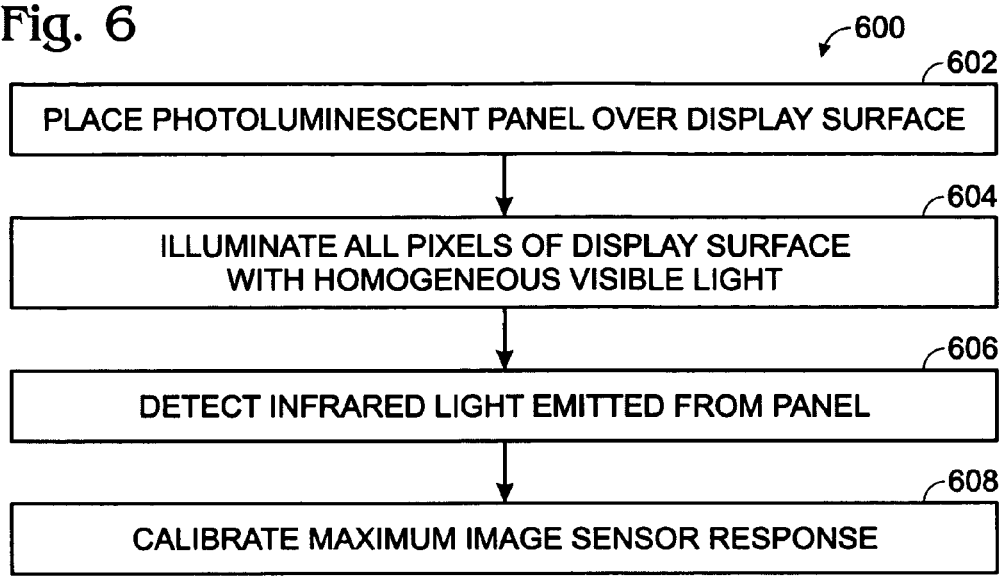
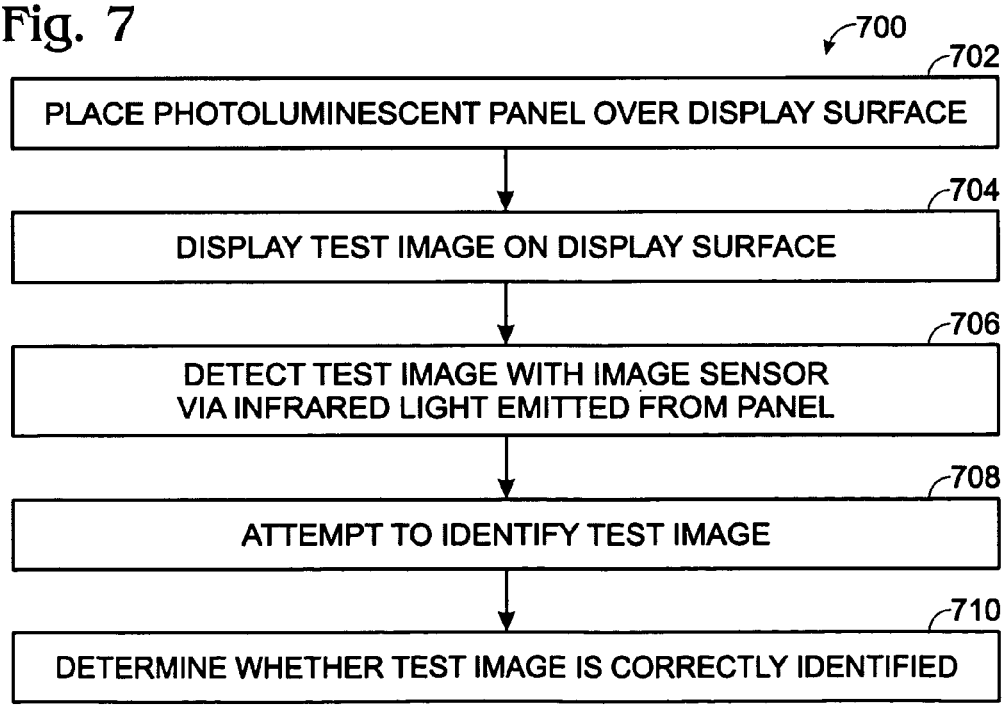

CALIBRATION OF AN OPTICAL TOUCH-SENSITIVE DISPLAY DEVICE

BACKGROUND

Optical touch-sensitive display devices may utilize one or more image sensors to detect a location of a touch on a display surface. The proper detection of, and response to, a touch input may depend upon the image sensor being positionally calibrated to the display surface. Proper calibration may help to ensure that specific locations on the display surface correspond to specific locations on the image sensor.

One method of calibrating an image sensor for an optical touch-sensitive display device involves placing over the display surface a panel marked with various indicia detectable by the image sensor. Proper placement of the panel over the display surface may allow specific pixels on the image sensor to be linked with specific locations on the display surface via detection of the indicia. However, improper placement of the panel may lead to improper calibration. Further, such a calibration method may not help to ensure that images are displayed at a correct location relative to the touch input, as it presupposes that the image production system is correctly aligned with the display surface.

SUMMARY

Accordingly, various embodiments are disclosed herein that are related to the calibration of an optical touch-sensitive display device. For example, one disclosed embodiment comprises a method of calibrating an optical touch-sensitive display device having a display surface, wherein the method comprises placing a photoluminescent panel over the display surface, and illuminating a target location on the display surface with visible light. Infrared light that is emitted by the panel in response to the illumination of the target location is received via the image sensor. The received light then is used to calibrate the device.

It should be understood that the summary above is provided to introduce in simplified form a selection of concepts that are further described in the Detailed Description. It is not meant to identify key or essential features of the claimed subject matter, the scope of which is defined uniquely by the claims that follow the Detailed Description. Further, the claimed subject matter is not limited to implementations that solve any disadvantages noted above or in any part of this disclosure.

BRIEF DESCRIPTION OF THE DRAWINGS

FIG. 4 shows a process flow of an embodiment of a method for calibrating an optical touch-sensitive display device.

FIG. 5 shows a process flow of another embodiment of a method for calibrating an optical touch-sensitive display device.

FIG. 6 shows a flow diagram depicting an embodiment of a method for calibrating a maximum brightness level of an image sensor in an optical touch-sensitive display device.

FIG. 7 shows a flow diagram depicting an embodiment of a method for performing performance testing of an optical touch-sensitive display device.

DETAILED DESCRIPTION

The embodiments disclosed herein relate to the use of a panel made of or coated with a photoluminescent material to calibrate an image sensor in an optical touch-sensitive display device. Briefly, a visible light image source in an optical touch-sensitive display device, such as an image projection system, may be used to illuminate a photoluminescent panel placed over a display surface. Then, light emitted by the photoluminescent panel in response to the absorption of this visible light is detected by the image sensor. In this manner, the image sensor may be directly calibrated to the visible light source. Further, because the calibration features are displayed on the photoluminescent panel via the image source of the optical touch-sensitive display device, the panel may simply be placed over the display surface, without any precise alignment step, for the calibration process. Additionally, such a method may allow the image sensor to be directly calibrated to the projector or other image display device, and thereby may allow the use of lower tolerances in the alignment of the projector or other image display device with the display surface.

Figure 1:
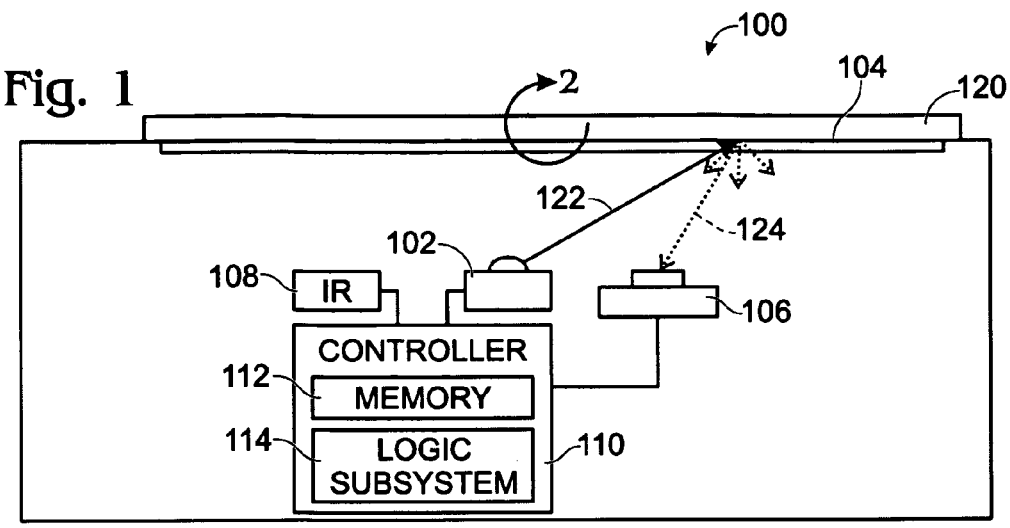
FIG. 1 shows a schematic view of embodiments of an optical touch-sensitive display device and photoluminescent calibration panel.

FIG. 1 shows an embodiment of an example optical touch-sensitive display device 100. The optical touch-sensitive display device 100 comprises an image source 102, such as a projection device, configured to form an image on a display surface 104. The optical touch-sensitive display device 100 also comprises an image sensor 106 for acquiring an infrared image of the display surface 104 to detect objects touching the display surface 104. The display surface 104 may comprise various structures such as diffuser layers, anti-glare layers, etc. not shown in detail herein. The optical touch-sensitive display device 100 further comprises an illuminant 108, depicted herein as an infrared light source, configured to illuminate a backside of the display surface 104 with infrared light. Infrared light from the illuminant 108 may be reflected by objects on the display surface 104, and then detected by image sensor 106 to allow detection of objects on the display surface 104. An optical filter (not shown) may be used to prevent unwanted wavelengths of light from reaching the image sensor 106. While the depicted embodiment comprises a single image sensor 104, it will be understood that an optical touch-sensitive display device may have any suitable number of image sensors which each may detect only a portion of the display surface 104, or an entire area of the display surface 104.

The optical touch-sensitive display device 100 further comprises a controller 110 having memory 112 and a logic subsystem 114. The memory 112 may comprise instructions stored thereon that are executable by the logic subsystem 114 to control the display of images on the display surface 104, and to detect objects on the display surface 104 via the image sensor 106. The memory 112 may further comprise instructions executable by the logic subsystem to control a calibration process for the image sensor 106 via a photoluminescent panel 120 placed over the display surface 104. As depicted in FIG. 1, an image sensor may be calibrated with a photoluminescent panel by first illuminating the panel with visible light 122 from the image source 102 at a target location on the display surface 104, and then detecting infrared light 124 emitted by the photoluminescent panel 120 in response to illuminating the target location. Such a process may be repeated for multiple pixels to calibrate multiple locations on the image sensor 106. Further, similar methods may be used for performance testing, calibrating a maximum response (i.e. maximum brightness) of the image sensor 106, as explained in more detail below.

In this manner, one or more specific pixels on the image sensor may be calibrated to one or more specific locations on the display surface and to one or more specific image source pixels in a single step. Further, the photoluminescent panel 120 need not be placed in any specific position to perform the calibration. In contrast, calibration of the image sensor 106 via a calibration panel with markings on the surface involves the careful and accurate placement of the marked panel on the display surface 104, and also involves a separate calibration of the image source 102 to the display surface 104. Therefore, the use of the photoluminescent panel 120 may greatly simplify a calibration process, and therefore reduce manufacturing costs and times for an optical touch-sensitive display device.

The term "target location" may refer to one or more pixels of the display surface 106 used in a calibration process. For example, in some embodiments, the target location may comprise one or more pixels at a corner of the display surface, while in other embodiments, the target location may comprise a continuous grid or other pattern displayed across the entire display surface. In yet other embodiments, multiple distinct target locations may be employed. For example, one or more pixels at each corner of the display surface, as well as various pixels along the sides of the display surfaces and at designated locations within an interior of the display surface, may be illuminated with visible light, in sequential and/or temporally overlapping manners, to allow pixels across the image sensor to be calibrated.

Figure 2:
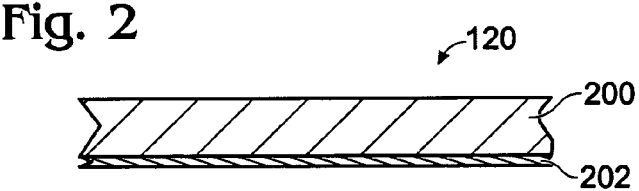
FIG. 2 shows a sectional view of the photoluminescent calibration panel embodiment of FIG. 1.

Any suitable photoluminescent material or materials may be used for photoluminescent panel 120. For example, suitable photoluminescent materials include materials that absorb visible light from the image source 102 and, in response, emit infrared light at a wavelength detected by the image sensor 106. The photoluminescent materials used in specific embodiments may be selected depending upon the peak red, green, and blue wavelengths output by a particular image source. In some embodiments, the panel may be made wholly from a photoluminescent material. In other embodiments, as shown in FIG. 2, the photoluminescent panel 120 may comprise a support sheet 200 coated with a photoluminescent material 202. In these embodiments, the photoluminescent material may be provided on the sheet in any suitable thickness and particulate or molecular density. Further, in some embodiments, the photoluminescent panel 120 may also be used to calibrate a maximum brightness for the pixels of the image sensor 106 by illuminating the entire area of the display surface 104 with uniform visible light. Where such a brightness calibration is to be performed, the photoluminescent panel 120 may be configured to emit infrared light at a substantially uniform flux across the entire area of the photoluminescent panel 120 given a substantially uniform flux of incident visible light of a substantially homogeneous wavelength.

Figure 3:
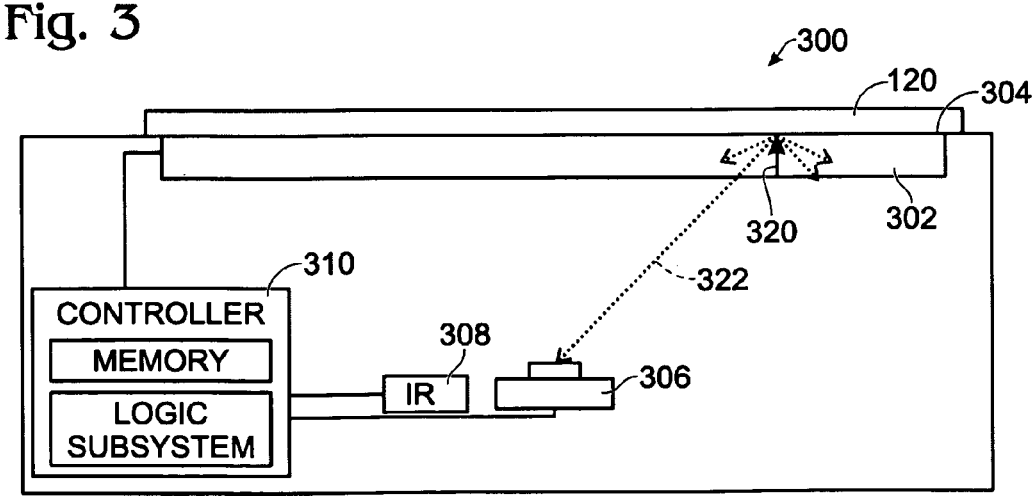
FIG. 3 shows a schematic view of another embodiment of an optical touch-sensitive display device.

FIG. 3 shows a block diagram of another embodiment of an optical touch-sensitive display device 300 that may be calibrated with the photoluminescent panel 120. Instead of a projection image source, the optical touch-sensitive display device 300 comprises an LCD (liquid crystal display) image source 302. The optical touch-sensitive display device 300 also comprises a display surface 304, an image sensor 306, an infrared illuminant 308, and a controller 310 configured to control the display device 300. Backlighting for the LCD image source may be provided in any suitable manner, including but not limited an optical wedge disposed behind the LCD image source, a UV-to-visible photoluminescent layer disposed behind the LCD image source, or a switchable diffuser that is turned on and off in synch with visible lights disposed behind the LCD image source.

As depicted in FIG. 3, the image sensor 306 may be calibrated by displaying visible light 320 at a selected target location on the display surface, and then detecting via the image sensor 306 infrared light 322 emitted from the photoluminescent panel 120 in response. In this manner, one or more specific pixels on the image sensor 306 may be linked to one or more specific pixels on the display surface 304, and also to one or more specific pixels on the liquid crystal image source 302, in a single step process. Further, in some embodiments, a maximum brightness of each pixel of the image sensor may be determined by illuminating the photoluminescent panel 120 with substantially uniform visible light across the entire surface of the display surface 304, and then using the infrared light received from the photoluminescent panel 120 at each pixel of the image sensor as a maximum brightness signal.

The various methods mentioned above are described in more detail with reference to FIGS. 4-7. First, FIG. 4 shows a flow diagram depicting an embodiment of a method 400 of calibrating an optical touch-sensitive display device. Method 400 comprises, at 402, placing a photoluminescent panel over a display surface of an optical touch-sensitive display device. Next, as shown at 404, a target location on the display surface and photoluminescent panel is illuminated with visible light from an image source of the optical touch-sensitive display device. Depending upon the particular image source used, this may comprise projecting an image at the target location via a projection image source, as shown at 406, displaying an image at the target location via an LCD display, as shown at 408, or illuminating the target location in any other suitable manner.

Next, method 400 comprises, at 410, receiving via an image sensor on the device infrared light emitted by the photoluminescent panel in response to illuminating the target location, and then, a 412, calibrating the image sensor via the infrared light received. For example, this may comprise calibrating a specific screen location or locations to one or more pixels of the image sensor that receive light from the target location, as indicated at 414. This also may comprise illuminating an extended target location, such as a grid pattern or the like, on the display surface to calibrate multiple locations on the image sensor. In this manner, the image sensor may be calibrated both to the display surface and to the image source in a quick and simple manner.

As mentioned above, in some embodiments, a plurality of target locations may be used in a calibration process. FIG. 5 shows an embodiment of a method 500 of calibrating an optical touch-sensitive display device that utilizes a plurality of target locations. Method 500 first comprises, at 502, placing a photoluminescent panel over a display surface of the optical touch-sensitive display device. Next, method 500 comprises, at 504, illuminating a first target location on the display surface and the photoluminescent panel with visible light from the touch-sensitive device image source. Then, at 506, infrared light emitted by the photoluminescent panel from the target location is received by the image sensor.

Continuing, method 500 next comprises, at 508, illuminating a second target location on the display surface and photoluminescent panel with visible light. The illumination of the second target location may be temporally overlapping with the illumination of the first target location, as indicated at 510, or may be performed sequentially after illuminating the first target location, as indicated at 512. In either case, light emitted by the photoluminescent panel from the second target location is received by the image sensor, as shown at 514. The infrared light received in response to illuminating the first and second target locations is then used to calibrate the image sensor, as shown at 516. As indicated at 518, calibration of the image sensor may comprise correlating pixels of the image sensor that receive light from the first and second target locations with a first display surface location and a second display surface location, respectively, and/or may involve any other suitable processes. While the depicted embodiment is described in the context of two target locations, it will be understood that a calibration method may utilize any suitable number of target locations, including but not limited to three or more, and may in some embodiments utilize very large numbers of target locations.

As mentioned above, a photoluminescent panel also may be used to calibrate a maximum brightness for each pixel of an image sensor. This may be performed, for example, to compensate for variations in pixel response in the image sensor, scratches on the display screen, and other such factors that may cause pixel-to-pixel variance in light sensitivity or response in the image sensor. FIG. 6 shows one embodiment of a method 600 of calibrating a maximum brightness for the pixels of an image sensor. Method 600 first comprises, at 602, placing a photoluminescent panel over a display surface of an optical touch-sensitive display device. Next, method 600 comprises, at 604, illuminating all pixels of the display surface with homogeneous visible light from the image source of the device, thereby causing the photoluminescent panel to emit light across the entire display surface. This emitted infrared light is detected, at 606, by the image sensor in the device, and used to calibrate a maximum image sensor brightness for each pixel in the image sensor, as indicated at 608.

A photoluminescent panel also may be used in performance testing of an optical touch-sensitive display device. It will be understood that the term "calibrating", "calibration", and other variants thereof as used herein encompass such device performance testing as well as light sensor calibration. Various types of performance testing may be performed. For example, where an optical touch-sensitive display device is configured to identify objects placed on the display surface of the device, speed testing may be performed in order to determine a round-trip time between displaying an image on a display surface with an image source and receiving an object recognition message. Likewise, reliability testing may be performed to test a device's ability to reliably recognize a series of displayed images, including worst-case images, fast-moving images (for testing the ability of the device to track an object in motion on the display surface), large numbers of objects, etc. By projecting onto a photoluminescent panel images of objects that a device is expected to recognize during use, testing of the device may be quickly and reproducibly performed without the use of actual objects on the display surface.

FIG. 7 shows an embodiment of a method 700 of performing performance testing on an optical touch-sensitive display device. Method 700 comprises, at 702, placing a photoluminescent panel over a display surface of the optical touch-sensitive display device, and then, at 704, displaying a test image on the display surface. Any suitable test image may be displayed, and may depend upon the nature of the test being performed. For example, where reliability testing is being performed, one or more images corresponding to actual objects expected to be identifiable by the device may be projected onto the display surface. Examples include, but are not limited to images of one or more fingers, of cell phones, cameras, beverage glasses, optically readable tags (e.g. bar codes and the like), etc.

Next, as indicated at 706, a test image is detected by the image sensor via infrared light emitted by the panel, and at 708, it is attempted to assign an identity to the test image. Then, at 710, it is determined whether the test image was correctly identified. If the correct identity is not assigned to an image, then problem shooting may be performed. It will be understood that similar processes may be used for speed testing (e.g. processes 710 may be substituted with a speed measurement process). Further, method 700 may be used as a part of an object tracking test, and/or to test the identification of large numbers of objects.

The calibration processes disclosed herein may be used with various system configurations. These processes may represent one or more different processing strategies such as event-driven, interrupt-driven, multi-tasking, multi-threading, and the like, and the disclosed processes may represent code programmed into machine-readable storage media. It will be understood that some of the process steps described and/or illustrated herein may in some embodiments be omitted without departing from the scope of this disclosure. Likewise, the indicated sequence of the process steps may not be required to achieve the intended results, but is provided for ease of illustration and description. One or more of the illustrated actions, functions, or operations may be performed repeatedly, depending on a particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. In an optical touch-sensitive display device comprising an image sensor and a display surface, a method of calibrating the display device, the method comprising:
    placing a photoluminescent panel over the display surface;
    illuminating a target location on the display surface with visible light;
    receiving via the image sensor infrared light emitted by the photoluminescent panel in response to illuminating the target location; and
    calibrating the display device via the infrared light received.

2. The method of claim 1, wherein calibrating the image sensor comprises assigning a specific screen location to a pixel of the image sensor that received the infrared light.

3. The method of claim 1, further comprising sequentially illuminating two or more target locations on the display surface.

4. The method of claim 1, further comprising illuminating two or more target locations on the display surface in a temporally overlapping manner.

5. The method of claim 1, further comprising calibrating a maximum image sensor brightness of a plurality of image sensor pixels by illuminating a corresponding group of display surface pixels with homogeneous visible light and detecting infrared light emitted from the panel.

6. The method of claim 1, wherein illuminating the target location on the display surface comprises displaying a test image on the display surface, and wherein calibrating comprises detecting the test image with the image sensor, assigning an identity to the test image, and determining whether the identity assigned to the test image is a correct identity.

7. The method of claim 1, wherein illuminating the target location on the display surface comprises projecting an image onto the display surface.

8. In an optical touch-sensitive display device comprising an optical touch-sensitive surface, a method of calibrating an image sensor, the method comprising:
    placing a photoluminescent panel over the optical touch-sensitive surface;
    illuminating a first target location on the optical touch-sensitive surface with visible light;
    receiving via the image sensor infrared light emitted from the photoluminescent panel in response to illuminating the first target location;
    illuminating a second target location on the optical touch-sensitive surface with visible light;
    receiving via the image sensor infrared light emitted from the photoluminescent panel in response to illuminating the second target location; and
    calibrating the optical touch-sensitive device via the infrared light received.

9. The method of claim 8, wherein calibrating comprises assigning a pixel on the image sensor that receives light emitted in response to illuminating the first target location a first screen position, and assigning a pixel on the image sensor that receives light emitted in response to illuminating the second target location a second screen position.

10. The method of claim 8, wherein the first target location and the second target location are illuminated sequentially.

11. The method of claim 8, wherein the first target location and the second target location are illuminated in a temporally overlapping manner.

12. The method of claim 8, wherein calibrating comprises calibrating a maximum image sensor brightness for a plurality of image sensor pixels by illuminating a plurality of display surface pixels with homogeneous visible light and detecting infrared light emitted from the panel.

13. The method of claim 8, further comprising displaying a test image on the optical touch-sensitive surface assigning an identity to the test image, and determining whether the identity assigned to the test image is a correct identity.

14. The method of claim 8, further comprising illuminating a third target location on the optical touch-sensitive surface.

15. An optical touch-sensitive display device, comprising:
    a display surface;
    an image source configured to produce an image viewable on the display surface;
    an image sensor configured to acquire an infrared image of the display surface;
    a logic subsystem; and
    memory comprising instructions executable by the logic subsystem to calibrate the optical touch-sensitive device by illuminating a target location on the display surface with visible light and receiving via the image sensor infrared light emitted in response to illuminating the target location.

16. The optical touch-sensitive display device of claim 15, wherein the instructions are further executable to calibrate the image sensor by assigning a specific screen location to a pixel of the image sensor that received the infrared light.

17. The optical touch-sensitive display device of claim 15, wherein the instructions are further executable to calibrate the optical touch-sensitive device by illuminating two or more target locations on the display surface, and receiving infrared light reaching the image sensor in response to illuminating each target location.

18. The optical touch-sensitive display device of claim 15, wherein the instructions are executable to calibrate the optical touch-sensitive device by illuminating a corresponding group of display surface pixels with homogeneous visible light and detecting infrared light emitted from the target location to calibrate a maximum image sensor brightness for a plurality of image sensor pixels.

19. The optical touch-sensitive display device of claim 15, further comprising a projection display system.

20. The optical touch-sensitive display device of claim 15, further comprising a liquid crystal display system.

* * * * *